United States Patent
Lange et al.

[11] 3,748,993
[45] July 31, 1973

[54] ELECTRICALLY CONTROLLED CAMERA SHUTTER

[75] Inventors: Karl-Heinz Lange, Bunde; Manfred Mailander, Rodinghausen, both of Germany

[73] Assignee: Balda-Werke, Bunde, Germany

[22] Filed: Aug. 15, 1972

[21] Appl. No.: 280,915

[30] Foreign Application Priority Data
Aug. 25, 1971 Germany............... P 21 42 468.0

[52] U.S. Cl. ............................. 95/53 EB, 95/62
[51] Int. Cl. ........................... G03b 9/10, G03b 9/62
[58] Field of Search.............. 95/53 R, 53 EB, 59, 95/62, 10 CT

[56] References Cited
UNITED STATES PATENTS

| | | | |
|---|---|---|---|
| 3,687,045 | 8/1972 | Rentschler | 95/53 EB X |
| 3,683,776 | 8/1972 | Shigeo Ino | 95/53 EB X |
| 3,661,066 | 5/1972 | Ettischer et al. | 95/53 EB X |
| 3,472,137 | 10/1969 | Galbraith, Jr. | 95/53 EB X |
| 3,645,187 | 2/1972 | Kitai | 95/62 |
| 3,645,186 | 2/1972 | Kitai | 95/59 |

*Primary Examiner*—Joseph F. Peters, Jr.
*Attorney*—Alex Friedman, Harold I. Kaplan et al.

[57] ABSTRACT

An electrically controlled camera shutter in which a shutter blade is swingable between shutter-closing and shutter-opening positions and is fixed with a shutter lever which is swingable with the shutter blade. An electromagnet includes an armature, and a swingable armature lever carries the armature and has a catch portion which coacts with a springy portion of the shutter lever to hold the shutter blade in its open position when the electromagnet is energized. When the electromagnet becomes unenergized it releases the armature lever so that the catch portion thereof releases the shutter lever enabling the shutter blade to return to its shutter-closing position.

12 Claims, 5 Drawing Figures

3,748,993

ELECTRICALLY CONTROLLED CAMERA SHUTTER

BACKGROUND OF THE INVENTION

The present invention relates to cameras.

In particular, the present invention relates to cameras which have electrically controlled shutters.

The present invention relates particularly to that type of electrically controlled camera shutter where a shutter blade is movable between shutter-closing and shutter-opening positions and is fixed with a shutter lever which coacts with an armature of an electromagnet to hold the shutter in its open position when the electromagnet is energized while permitting the shutter to close when the electromagnet becomes unenergized.

With a known camera shutter of this type, the armature of the electromagnet is carried by an armature lever which is arranged coaxially with a pawl which is under the influence of a spring. When the electromagnet is energized the pawl holds the lever which carries the shutter blade in a position which maintains the shutter open. When the magnet becomes unenergized, the armature thereof transmits movement to the pawl which now releases the shutter lever.

This type of construction has the disadvantage of requiring in its mechanism a relatively large number of components which must be very precisely manufactured and assembled with each other. The manufacture and mounting of this mechanism is therefore relatively complex and expensive.

Furthermore, the armature lever and the pawl have a relatively large mass which works against the required rapid falling of the armature lever essential for achieving an unretarded release of the shutter enabling the latter to quickly return to its closed position.

In order to achieve a greater acceleration of such a mass it is of course possible to use stronger springs, but this measure would require a more powerful magnet. However, a more powerful magnet is not desirable for other reasons.

SUMMARY FO THE INVENTION

It is accordingly a primary object of the present invention to provide a construction of the above type which will avoid the above drawbacks.

Thus, it is an object of the invention to provide a shutter of the above general type which has the smallest possible number of individual components which are of a light weight and inexpensive to manufacture.

According to the invention a swingable shutter blade is fixed with a shutter lever which has a springy means while the electromagnet has an armature carried by an armature lever which has a catch means with which said springy means coacts to be held by said catch means in the position maintaining the shutter open when the electromagnet is energized. When the electromagnet is unenergized the armature lever is released to swing in a manner releasing the springy means of the shutter lever so that the shutter can return quickly to its closed position. According to a preferred construction the armature lever of the invention is in the form of a one-piece component.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
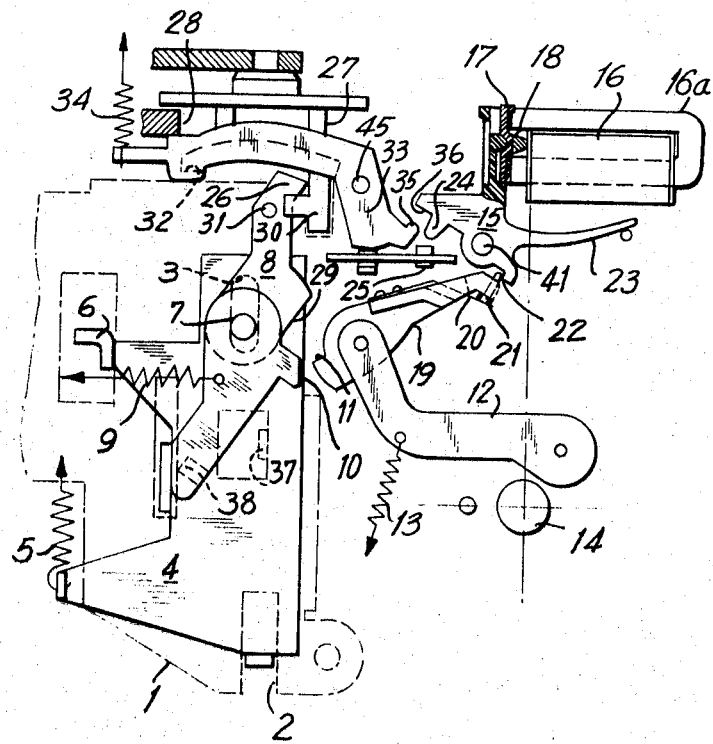
FIG. 1 is a schematic front elevation of a shutter according to the invention.

Referring first to FIG. 1, there is schematically illustrated therein, in phantom lines, a stationary support plate 1 which is carried by the unillustrated camera housing and which is formed with an elongated notch 2 as well as an elongated slot 3. The shutter referred to below is released upon depression of a shutter-release component 4 which has a lug movable along the notch 2 in order to be guided thereby while carrying a pin 7 which is movable along the slot 3, so that in this way the shutter-release component 4 is guided for vertical movement. In order to release the shutter the operator depresses the shutter-release component 4 in opposition to the spring 5, the component 4 carrying a lug 6 which is accessible to the operator for depression of component 4 when it is desired to release the shutter and make an exposure. The pin 7 which moves along the slot 3 in order to contribute to the guiding of the component 4 which carries the pin 7 also serves as a pivot for a cocking lever 8. The cocking lever 8 is under the influence of a spring 9 which seeks to turn the lever 8 in a clockwise direction, as viewed in the drawing. The lever 8 is shown in FIG. 1 in the position it takes after it has run down upon depression of the shutter-release component 4 by the operator. During swinging of the cocking lever 8 to the position shown in FIG. 1, a projection 10 of the lever 8 engages a projection 11 of a shutter lever 19 to turn the shutter lever 19 in a counterclockwise direction, as viewed in FIG. 1, to the position illustrated in FIG. 1, and this shutter lever 19 is fixed with and situated in a plane behind the shutter blade 12 shown in FIG. 1. Thus, the swinging of the lever 19 by the projection 10 of the lever 8 swings the shutter blade 12 which is fixed to the lever 19 for swinging movement therewith to the shutter-opening position of FIG. 1 where the shutter opening 14 is uncovered so that the film will be exposed. A spring 13 is connected with the shutter blade 12 to urge the latter to its shutter-closing position and of course to turn the shutter lever 19 with the blade 12 back to its starting position in a clockwise direction, as viewed in FIG. 1.

The illustrated structure includes an electromagnet means 16 which has a core 16a the left end of which engages a predetermined area of an armature plate 17 when the electromagnet means 16 is energized. The armature plate 17 is held in position by a strap 18 of an armature lever 15 which is swingable about the pivot 41. Just before opening of the shutter during the initial part of the depression of the component 4 the electromagnet means is energized to attract the armature 17 so as to place it in the position shown in FIG. 1, and this displacement of the armature 17 swings the armature lever 15 in a clockwise direction, as viewed in FIG. 1, so that the armature lever 15 is in the position illustrated in FIG. 1 just prior to swinging of the shutter lever 19 in a counterclockwise direction by the projection 10 of the cocking lever 8. The parts will remain in the position shown in FIG. 1 as long as the electromagnet means 16 remains energized.

Toward the end of the opening movement of the shutter blade 12 a springy means carried by the shutter lever 19 engages a catch means of the armature lever 15 so that this catch means coacts with the springy means to hold the parts in the position shown in FIG. 1. The springy means of the shutter lever 19 is formed by a pin 21 urged upwardly toward the right, as viewed in FIG. 1, by a leaf spring 20 which is fixed to the shutter lever 19, the pin 21 being guided in a bore which is formed through the lever 19 at its right free end portion, as viewed in FIG. 1. The catch means of the armature lever 15 is in the form of a tooth 22 having, as viewed in FIG. 1, an upper left catch surface behind which the pin 21 snaps when the lever 19 has been displaced to the position shown in FIG. 1. Referring to the lower right of FIG. 4, it will be seen that the tooth 22 has the catch surface 22a behind which the pin 21 of the springy means snaps so that when the armature lever 15 is in the holding position shown in FIG. 1, as a result of energizing of the electromagnet means 16, the surface 22a of the catch means will coact with the pin 21 of the springy means of the shutter lever 19 to hold the latter in the position of FIG. 1 where the blade 22 is maintained in its open position in opposition to the spring 13.

A suitable photoelectrically controlled circuit may be provided for determining the exposure time, and in a well known manner when the exposure time has elapsed the electromagnet means 16 will become unenergized. As will be apparent from the description which follows the armature lever 15 is made of a suitable plastic material and it is urged toward its release position by a spring means which in the illustrated example is formed by an elongated springy extension 23 of the armature lever 15. This extension 23 is made of the same plastic as the lever 15 and has springy properties according to which it coacts with the stop pin shown at the right of the springy extension 23 for urging the lever 15 in a counterclockwise direction around the pivot 41 to the release position of the lever 15.

Of course, when the electromagnet means is energized to place the lever 15 in the position shown in FIG. 1, the spring 20 yields while the top end of the pin 21 moves along the lower surface of the tooth 22 until the pin 21 snaps behind the surface 22a, as described above.

On the other hand, when the electromagnet becomes unenergized, the plastic elongated spring means 23 acts to turn the lever 15 in a counterclockwise direction, as viewed in FIG. 1, around the pin 41 to displace the catch means 22 to a position where it releases the pin 21 of the springy means of the lever 19 so that the lever 19 and the shutter blade 12 are released to enable the spring 13 to return the shutter blade 12 to its shutter-closing position.

At this time which is to say during return of the armature lever 15 by the spring means 23 thereof to the release position, a projection 24 of the armature lever 15 opens a switch 25 of the electrical circuitry. This switch 25 closes during the shutter-releasing operations. As a result of the opening of the switch 25 in this manner the entire circuit which is not further illustrated becomes unenergized.

Figure 2:
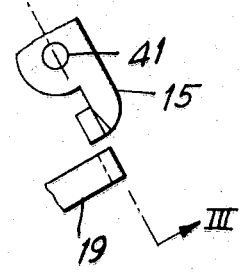
FIG. 2 is a schematic side elevation of parts of an armature lever and shutter lever which have a construction different from that of FIG. 1.
Figure 3:
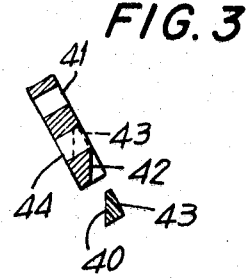
FIG. 3 is a transverse section of the structure of FIG. 2 taken along line III—III of FIG. 2 in the direction of the arrows.

According to the embodiment of the invention which is illustrated in FIGS. 2 and 3, the armature lever 15 has a catch means different from the tooth 22 while the shutter lever 19 has a springy means different from the spring 20 and pin 21. The shutter lever 19 of the FIG. 2 has at its right free end a springy portion capable of yielding in a direction perpendicular to the plane in which the lever 19 swings. This springy portion or springy means 43 of the shutter lever 19 has an inclined surface portion 40 which is inclined at an angle of approximately 30° with respect to the plane in which the lever 19 turns. The catch means of the armature lever 15 has a corresponding inclined surface 42 along which the surface 40 slides during turning of the lever 19 to the position shown in FIG. 1, to maintain the shutter open, and the displacement of the surface 40 along the surface 42 results in deflection of the springy portion 43 of the lever 19 to the right, as viewed in FIG. 3, until the springy portion 43 snaps behind the catch surface 44 so that the springy portion 43 assumes the dotted line position shown in FIG. 3 where the catch means of this embodiment will also hold the shutter lever 19 in the position illustrated in FIG. 1. When the armature lever is returned by an unillustrated spring means back to its release position, the projection at the springy portion 43 of the lever 19 is released by the lever 15, which now swings in a counterclockwise direction, as viewed in FIG. 1, so that the shutter blade 12 can again be returned by the spring 13 in the above-described manner to the shutter-closing position.

When the operator releases the shutter-releasing component 4, the spring 5 returns the latter upwardly to its starting position. In this way an upper end portion 26 of the cocking lever 8 is displaced upwardly to the path of turning of a cocking tooth 27 fixed to a rotary element which is turned by the operator when the film is transported to situate the next film frame in a position for exposure. Thus the cocking tooth 27 will now act on the lever 8 to return it to the cocking position, in a counterclockwise direction in opposition to the spring 9 of FIG. 1, and this turning of the lever 8 to assume its cocking position continues until the left edge of projection 26 engages a stationary stop surface 28. The result is that the right control edge 29, as viewed in FIG. 1, of the lever 8 releases a shiftable stop component 30 which blocks further transport of the film in a known way, and at the same time places in an unillustrated manner the structure in a condition for making the next exposure.

The lever 8 carries a pin 31 which at this time enters a hook-shaped pocket or recess 32 of a motion-transmitting lever 33. During the next actuation of the shutter to make an exposure, while the component 4 is depressed by the operator, the lever 8 will displace the pin 31 downwardly so that the pin 31 will act on the left end of the motion transmitting lever 33, due to location of the pin 31 in the pocket 32, so that in this way the left end of the lever 33 is displaced downwardly in opposition to the spring 34 shown at the upper left of FIG. 1. Since the lever 33 is swingable on a stationary pin 45, the right end 35 of the lever 33 engages the actuating surface 36 of the armature lever 15 to turn the lever 15 in a clockwise position placing the armature plate 17 again in engagmeent with the core 16a of the electromagnet means 16.

During the continued downward movement of the shutter-release component 4 the cocking lever 8 is prevented from being turned by the spring 9 in a clockwise direction around the downwardly moving pin 7 first by the cocking tooth 27 and then by a stationary lug 37 of the plate 1 which is situated at this time just to the left of a projection 38 of the lever 8 so that this projection 38 is prevented by the lug 37 from moving to the left while the lug 38 moves downwardly along the lug 37. However, as soon as the lug 38 reaches the bottom end of the lug 37, the spring 9 acts to forcefully turn the lever 8 in a clockwise direction, bringing about in this way a striking of the projection 10 against the projection 11 to displace the blade 12 to the open position shown in FIG. 1 in opposition to the spring 13.

At the beginning of the turning of the lever 8 by the spring 9 in a clockwise direction around the pin 7, the pin 31 moves out of the pocket 32, thus releasing the lever 33 so that the spring 34 returns the lever 33 to the position thereof shown in FIG. 1. In this way the lever 33 assumes the position of FIG. 1 which frees the lever 15 for return to its release position by the spring 23 as soon as the armature 16 becomes unenergized.

Thus, as was pointed out above, with the parts in the position of FIG. 1, as soon as the exposure time has elapsed, the electromagnet means 16 will become unenergized to release the armature lever 15 for return to its release position.

Figure 4:
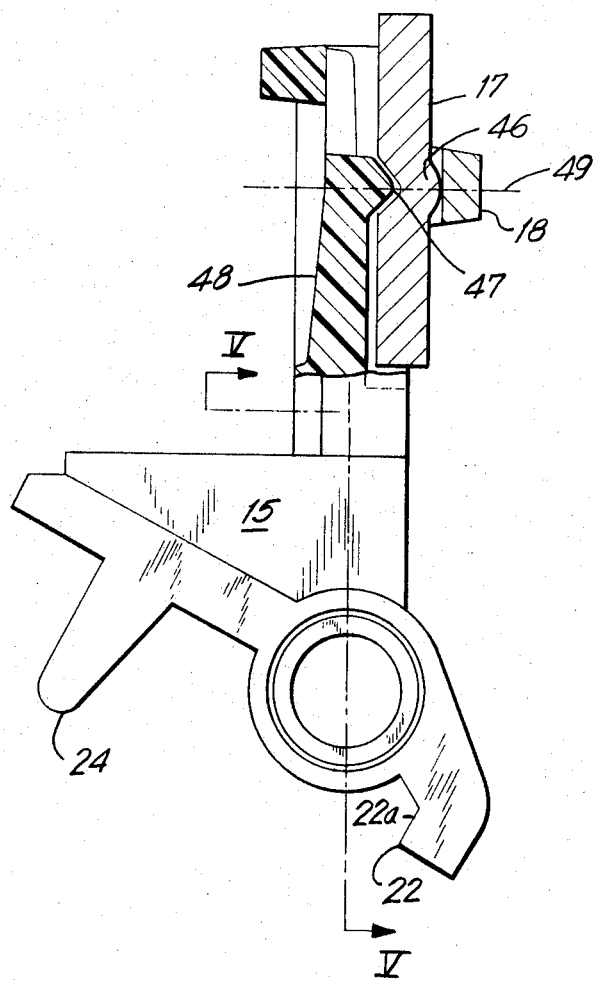
FIG. 4 is a partly sectional side elevation of one embodiment of an armature lever of the invention.
Figure 5:
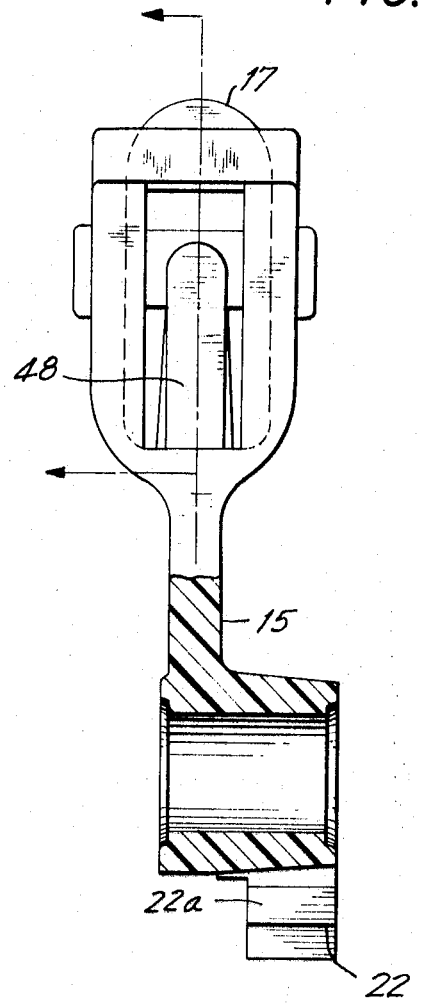
FIG. 5 is a transverse section of the structure of FIG. 4 taken along line V—V of FIG. 4 in the direction of the arrows, the sectional part of FIG. 4 being taken along line IV—IV of FIG. 5 in the direction of the arrows.

An embodiment of the armature lever is illustrated in detail in FIGS. 4 and 5. With this embodiment the elongated springy plastic extension 23 is an integral part of and extends from the lever 15. As is apparent from FIGS. 4 and 5, the armature plate 17 is deformed at its central region so that it has a bulging or projecting portion 46 at its right surface and a corresponding depression 47 at its left surface, as viewed in FIG. 4. The plastic lever 15 has the elongated strap 18 which extends across the right surface of the plate 17, as viewed in FIG. 4, in the direction perpendicular to the plane of FIG. 4, and the inner surface of the strap 18 is engaged by the bulging portion 46 of the plate 17. The depression 47 receives a correspondingly shaped projection formed at the free end of a springy tongue 48 of the lever 15. In this way the armature plate 17 is clamped between the projection of the tongue 48 and the strap 18 while at the same time being freely tiltable. The points of engagement between the armature plate 17, the strap 18, and the projection of the tongue 48 are located along a common straight line 49 which is perpendicular to the plate 17. This line 49 extends through the center of the area of engagement between the armature plate 17 and the core 16a.

As is apparent from the above description, the structure of the present invention has the advantage of requiring only a small number of easily manufactured components which are of a light weight and which are easy to assemble. In this way the manufacturing costs are reduced and at the same time the armature lever can return more rapidly to its release position, as compared to previously known constructions, even though the return spring is not made more powerful. By eliminating an additional component such as an additional pawl, or in other words a second part of the armature lever, it is possible to achieve with a lesser amount of material an armature lever which has the same strength as a conventional armature lever, so that in this way a lighter construction is achieved.

The construction of shutter lever 19 according to the embodiment of FIGS. 2 and 3 is of particular advantage since in this construction the shutter lever is made only of one piece, and the armature lever 15 is also a one-piece component, so that the absolute minimum number of components are provided with the invention. Springs to make it possible to hold the shutter lever 19 become unnecessary since their operations are carried out by the shutter lever 19 itself.

As was pointed out above, according to a preferred construction of this embodiment of FIGS. 2 and 3 the surfaces 42 and 40 are situated approximately at an angle of 30° with respect to the plane in which the lever 19 turns. Thus, as a result of this feature the springy free end portion of the lever 19 continuously yields in a gradual manner to an increasing extent until the tooth formed by the portion 43 snaps behind the surface 44. Thus a secure holding of the lever 19 is assured.

However, the springy means in the form of the pin 21 and the spring 20 may be preferred in those cases where there is insufficient room to provide for a yielding of the free end of the lever 19 in a direction perpendicular to the plane in which it swings.

Also, it will be noted that according to FIGS. 4 and 5 the armature lever is made entirely of plastic and clamps the metal armature plate which is free to tilt.

The situation of the points of contact between the tongue 48, the plate 17, and the strap 18 along the straight line 49 which is at the center of the area of engagement between the plate 17 and the core 16a achieves an absolutely uniform engagement between the armature plate and the left end surface of the core 16a, as viewed in FIG. 1.

By manufacturing the armature lever of plastic such as, for example, acetal resin or polycarbonate, it becomes possible without further measures to select the shape of the armature lever in such a way that the armature plate is held while being freely tiltable. The armature plate need only be pushed between the strap 18 and the tongue 48. By a suitable configuration either of the armature plate and/or the strap and springy tongue the armature plate when in its assembled condition shown in FIGS. 4 and 5 has the possibility of lying flush against the core 16a of the electromagnet means 16.

As was indicated above it is preferred to situate the shutter lever 19 in a plane which is spaced from the plane occupied by the shutter blade 12, FIG. 1 showing the lever 19 behind the plate 12 while being fixed to the latter. This construction gives the designer the greatest possible freedom in the arrangement of the shutter and its actuating mechanism.

What is claimed is:

1. In a camera, a swingable shutter blade swingable between shutter-closing and shutter-opening positions and a shutter lever fixed to said shutter blade for swinging movement therewith, electromagnet means including an armature, armature-lever means carrying said armature to be swung to a holding position when said electromagnet means is energized and a release position when said electromagnet means is unenergized, said armature lever means carrying a catch means and said shutter lever means carrying a springy means which engages said catch means to hold said shutter lever in a position maintaining said shutter blade in its shutter-opening position when said electromagnet means is energized, said electromagnet means when unenergized releasing said armature lever for displacing said catch means thereof to release said springy means of said shutter lever to that the shutter blade can return to its shutter-closing position.

2. The combination of claim 1 and wherein said armature lever is a one-piece component.

3. The combination of claim 1 and wherein said shutter lever swings in a given plane while said springy means thereof is yieldable in a direction perpendicular to said plane and includes a projection, said catch means of said armature lever having a catch surface behind which said projection of said springy means snaps to place said shutter lever in a condition where it is held by said armature lever when said electromagnet means is energized.

4. The combination of claim 3 and wherein said catch means of said armature lever and said projection of said springy means have surfaces which slide one with respect to the other and which are inclined at an angle of approximately 30° with respect to the plane in which said shutter lever turns.

5. The combination of claim 1 and wherein said springy means of said shutter lever includes a spring-pressed pin.

6. The combination of claim 1 and wherein said armature lever is made of a plastic while said armature is in the form of a plate, said armature lever carrying a means for clamping said armature plate to said armature lever while freeing said armature plate for tilting movement with respect to said armature lever.

7. The combination of claim 6 and wherein said means carried by said armature lever for clamping said armature plate while freeing the latter for tilting movement includes a strap of said armature lever extending across said armature plate on one side thereof and a springy tongue of said armature lever situated at the other side of said armature plate and holding the latter against said strap.

8. The combination of claim 7 and wherein the armature plate, strap, and tongue have with respect to each other points of engagement situated along a line which is perpendicualr to said armature plate.

9. The combination of claim 8 and wherein said electromagnet means includes a core which has a surface area engaged by a corresponding surface area of said armature plate when said electromagnet means is energized, and said line passing through the center of said surface area.

10. The combination of claim 1 and wherein a return spring is operatively connected with said armature lever for returning the latter to a rest position when said electromagnet means is unenergized.

11. The combination of claim 10 and wherein said return spring is in the form of a springy extension of said armature lever.

12. The combination of claim 1 and wherein said shutter blade and shutter lever are respectively situated in planes which are spaced from each other.

* * * * *